US007966327B2

(12) United States Patent
Li et al.

(10) Patent No.: US 7,966,327 B2
(45) Date of Patent: Jun. 21, 2011

(54) SIMILARITY SEARCH SYSTEM WITH COMPACT DATA STRUCTURES

(75) Inventors: Kai Li, Princeton, NJ (US); Qin Lv, Princeton, NJ (US); Moses Charikar, Princeton, NJ (US)

(73) Assignee: The Trustees of Princeton University, Princeton, NJ (US)

( * ) Notice: Subject to any disclaimer, the term of this patent is extended or adjusted under 35 U.S.C. 154(b) by 1257 days.

(21) Appl. No.: 11/219,822

(22) Filed: Sep. 7, 2005

(65) Prior Publication Data
US 2006/0101060 A1    May 11, 2006

Related U.S. Application Data

(60) Provisional application No. 60/625,828, filed on Nov. 8, 2004.

(51) Int. Cl.
G06F 17/30    (2006.01)
(52) U.S. Cl. .................................................. 707/737
(58) Field of Classification Search .............. 707/1, 2, 707/100, 101, 102, 104.1; 709/216, 217, 709/218; 345/419; 348/625; 358/487
See application file for complete search history.

(56) References Cited

U.S. PATENT DOCUMENTS

| 4,683,496 | A * | 7/1987 | Tom .............................. 348/625 |
| 5,220,441 | A * | 6/1993 | Gerstenberger ............... 358/487 |
| 5,432,895 | A * | 7/1995 | Myers ............................ 345/419 |
| 7,158,961 | B1 | 1/2007 | Charikar |
| 2002/0128997 | A1 * | 9/2002 | Kil et al. ........................... 707/1 |
| 2004/0133526 | A1 * | 7/2004 | Shmueli et al. ................. 705/80 |
| 2007/0118432 | A1 * | 5/2007 | Vazirani et al. ................. 705/26 |

OTHER PUBLICATIONS

C. Carson, M. Thomas, S. Belongie, J. M. Hellerstein, and J. Malik. Blobworld, "Blobworld: A system for region-based image indexing and retrieval," In Proc. of 3rd Intl. Conf. on Visual Information and Information Systems, pp. 509-516 (1999).
W. Ma and B. S. Manjunath, "NETRA: A toolbox for navigating large image databases," Multimedia Systems, 7(3):184-198 (1999).
J. R. Smith and S.F. Chang, "VisualSEEk: A fully automated content-based image query system," In Proc. of ACM Multimedia'96, pp. 87-98 (1996).
A. Natsev, R. Rastogi, and K. Shim, "WALRUS: A similarity retrieval algorithm for image databases," In Proc. of ACM SIGMOD'99, pp. 395-406 (1999).

(Continued)

*Primary Examiner* — Diane Mizrahi
(74) *Attorney, Agent, or Firm* — 24IP Law Group; Timothy R. DeWitt (57) ABSTRACT

A content-addressable and -searchable storage system for managing and exploring massive amounts of feature-rich data such as images, audio or scientific data, is shown. A segmentation and feature extraction unit segments data corresponding to an object into a plurality of data segments and -generates a feature vector for each data segment. A sketch construction component converts the feature vector into a compact bit-vector corresponding to the object. The system also has a similarity index having plurality of compact bit-vectors corresponding to a plurality of objects and an index insertion component for inserting a compact bit-vector corresponding to an object into the similarity index. The system may further have an indexing unit for identifying a candidate set of objects from said similarity index based upon a compact bit-vector corresponding to a query object. Still further, the system may additionally have a similarity ranking component for ranking objects in said candidate set by estimating their distances to the query object.

10 Claims, 2 Drawing Sheets

OTHER PUBLICATIONS

S. Ardizzoni, I. Bartolini, and M. Patella, "Windsurf: Region-based image retrieval using wavelets," In DEXA Workshop, pp. 167-173 (1999).

I. Bartolini, P. Ciaccia, and M. Patella, "A sound algorithm for region-based image retrieval using an index," In DEXA Workshop, pp. 930-934 (2000).

J. Z. Wang, J. Li, and G. Wiederhold, "SIMPLIcity: Semantics-sensitive integrated matching for picture libraries," IEEE Trans. on Pattern Analysis and Machine Intelligence, 23(9):947-963 (2001).

S. Cohen and L. Guibas, "The Earth Mover's Distance under Transformation Sets" IEEE International Conference on Computer Vision, Sep. (1999).

Y. Rubner, et al., "A Metric for Distribution with Applications to Image Databases." IEEE International Conference on Computer Vision, Bombay, India (1998).

Y. Rubner, et. al., "Empirical Evaluation of Dissimilarity Measures for Color and Texture." Elsevier Science USA (2001).

Y. Rubner, L. Guibas, and C. Tomasi, "The Earth Mover's Distance, Multi-Dimensional Scaling, and Color-Based Image Retrieval." Jul. 22, 1998.

S. Cohen, "Finding Color and Shape Patterns in Images." May (1999).

P. Indyk and N. Thaper, "Fast image retrieval via embeddings," 3rd Int'l Workshop on Statistical and Computational Theories of Vision (2003).

* cited by examiner

SIMILARITY SEARCH SYSTEM WITH COMPACT DATA STRUCTURES

CROSS-REFERENCE TO RELATED APPLICATIONS

The present application claims the benefit of the filing date of U.S. Provisional Patent Application Ser. No. 60/625,828, entitled "Image Similarity Search with Compact Data Structures" and filed on Nov. 9, 2004 by inventors Kai Li, Qin Lv and Moses Charikar.

The above cross-referenced related application is hereby incorporated by reference herein in its entirety.

STATEMENT REGARDING FEDERALLY SPONSORED RESEARCH OR DEVELOPMENT

Not applicable.

BACKGROUND OF THE INVENTION

1. Field of the Invention

The present invention relates to a content-addressable and searchable storage system to provide effective capabilities to access, search, explore and manage massive amounts of diverse feature-rich data.

2. Description of the Related Art

The world is moving into the age where all information is digitized and where the world is interconnected by digital means. Recent studies suggest that the volume of digital data on magnetic disks as well as the capacity of a disk have been doubling every year in the past decade. If this trend continues, the capacity of a single disk will reach 1 terabyte in 2007 and 1 petabyte by 2022. As data volume and storage capacity continue to increase exponentially, storage systems, as part of the operating system, must provide new abilities to access, search, explore, and manage massive amounts of data.

A key challenge in building next-generation storage systems is to manage massive amounts of feature-rich (non-text) data, which has dominated the increasing volume of digital information. Feature-rich data are typically sensor data such as audio, images, video, genomics, or scientific data; they are noisy and high-dimensional. Current file systems are designed for named text files, and they do not have mechanisms to manage feature-rich data.

In current systems, the user must name each file and find a place to store it, and then she must know the name in order to access it later. For example, today's digital cameras automatically generate meaningless file names for their images. These file names are difficult to remember, they often are duplicative of names of files previously downloaded from the camera, and they have no correlation with the image content. To find a specific image file, the user has to look through the image thumbnails instead of the file names.

Further, current file systems use directories to organize files. Directories emulate the management of paper files and have been helpful in managing paper-like documents. Some recent file systems attempt to provide content-based search tools, but they are limited to exact searches for text and annotations of non-text data. Manual annotation, however, is not practical for feature-rich data because such data are massive, noisy and high dimensional.

Pattern matching tools, document viewers, image thumbnail generators, and directory browsers are already integral components of a modern operating systems. However, such tools are limited to exploring text documents or viewing simple images; they are not useful to explore noisy, high-dimensional data.

The management of digital data calls for a fundamentally different paradigm. A disk in the future will store significantly more data than the amount of paper data one can handle in one's lifetime; in fact, much more data than the entire Library of Congress. A paper document is inherently tied to a physical location, but this is not true for digital data. Paper management systems force users to put a file into a fixed category, and current file systems follow a similar paradigm. In contrast, feature-rich data can be organized in multiple ways and thus have many attributes, most of which are unknown at the time the data is created.

Since searching in high dimensional spaces is a challenging problem, practical proposed search solutions such as the Google search engine have been limited to searching for exact matches—they tend to work only for text documents and text annotations. Search engines such as Google index documents by building an inverted index. A number of data structures have been devised for nearest neighbor searching such as R-Trees, k-d trees, ss-trees, and SR-trees. These are capable of supporting similarity queries, but they do not scale satisfactorily to large high-dimensional data sets. Several constructions of nearest neighbor search data structures have recently been devised in the theory community, but practical implementations of those theoretical ideas for high dimensional data do not exist yet.

Similarity searching on time series or sequence data have been investigated recently. Range searches and nearest neighbor searches in whole matching and subsequence matching have been the principal queries of interest for time series data. For whole matching, several techniques have been proposed to transform the time sequence to the frequency domain by using DFT (Discrete Fourier Transform) and wavelets to reduce dimensions. For subsequence matching, solutions include I-adaptive index to solve the matching problem for searches of pre-specified lengths, PAA (Piecewise Aggregate Approximation) technique to average values of equal-size windows of the time sequence or APCA (Adaptive Piecewise Constant Approximation) to average values of variable-size windows of the time sequence of the time sequence, and a multi-resolution index data structure. These techniques focus on the specifics of time series and not a general-purpose similarity search engine.

Thus, to date, there is no practical file system with the ability to do similarity searches for noisy, high-dimensional data and there is no index engine designed for efficient similarity searches.

Recently, the theory research community has made advances in areas such as compact data structures (sketches) and dimension reduction techniques. For example, a distance function on pairs of data items can be estimated by only examining the sketches of the data items. The existence of a sketch depends crucially on the function one desires to estimate. The successful construction of a small sketch as the metadata to estimate the distance between two points in high-dimensional space has significant implications on solving the efficient similarity search problem because it can provide significant savings in space and running time.

Sketching techniques for documents (represented as sets) have been developed. The construction, based on min-wise independent permutations, was used to compute compact sketches for eliminating near-duplicate documents in the Altavista search engine. Other research introduced the notion of locality-sensitive hashing, which is a family of hash functions where the collision probability is higher for objects that are closer. Such hash functions are very useful in the construction of data structures for nearest neighbor search. A variant of locality-sensitive hashing, called similarity-preserving hashing, was investigated by co-inventor of the present invention, Moses Charikar. He developed a sketch construction for the earth mover's distance (EMD) which had been investigated and used before in the context of determining image similarity and navigating image databases. A closely related idea for sketching EMD was devised and used for image retrieval and was evaluated using exact EMD as ground truth, i.e. they were not concerned with how well their method performed compared to perceptual similarity of images.

Many other techniques have been proposed for image similarity search. One technique may be referred to as region based image retrieval (RBIR). Most RBIR systems use a combination of color, texture, shape, and spatial information to represent a region.

In C. Carson, M. Thomas, S. Belongie, J. M. Hellerstein, and J. Malik. Blobworld, "Blobworld: A system for region-based image indexing and retrieval," In Proc. of 3rd Intl. Conf. on Visual Information and Information Systems, pages 509-516 (1999), the authors describe a technique in which each region is represented by a 218-bin color histogram, mean texture contrast and anisotropy, centroid, area, eccentricity and orientation, which is a very complicated representation.

In W. Ma and B. S. Manjunath, "NETRA: A toolbox for navigating large image databases," Multimedia Systems, 7(3):184-198 (1999), the authors describe another technique that uses a complicated region representation. It quantizes the RGB color space into 256 colors, and each region's color is represented by $\{(c_1, p_1), \ldots, (c_n; p_n)\}$, where $c_i$ is the color code and $p_i$ is the fraction of that color in the region. Texture is represented by normalized mean and standard deviation of a set of Gabor wavelet transformations with different scales and directions.

In J. R. Smith and S. F. Chang, "VisualSEEk: A fully automated content-based image query system," In Proc. of ACM Multimedia'96, pages 87-98 (1996), the authors describe a technique that extracts salient color regions using a back-projection technique and supports joint color-spatial queries. A selection of 166 colors in the HSV color space are used. Each region is represented by a color set, region centroid, area, width and height of the minimum bounding rectangle.

In A. Natsev, R. Rastogi, and K. Shim, "WALRUS: A similarity retrieval algorithm for image databases," In Proc. of ACM SIGMOD'99, pages 395-406 (1999), the authors describe a technique that segments each image by computing wavelet based signatures for sliding windows of various sizes and then clusters them based on the proximity of their signatures. Each region is then represented by the average signature.

In S. Ardizzoni, I. Bartolini, and M. Patella, "Windsurf: Region-based image retrieval using wavelets," In DEXA Workshop, pages 167-173 (1999) and I. Bartolini, P. Ciaccia, and M. Patella, "A sound algorithm for region-based image retrieval using an index," In DEXA Workshop, pages 930-934 (2000), the authors describe a technique that performs 3-level Haar wavelet transformation in the HSV color space and the wavelet coefficients of the 3rd level LL subband are used for clustering. Each region is represented by its size, centroid and corresponding covariance matrices.

In J. Z. Wang, J. Li, and G. Wiederhold, "SIMPLIcity: Semantics-sensitive integrated matching for picture libraries," IEEE Trans. on Pattern Analysis and Machine Intelligence, 23(9):947-963 (2001), the authors describe a system that partitions an image into 4×4 blocks and computes average color and wavelet coefficients in high frequency bands.

Current region-based image similarity measures can be roughly divided into three categories: (independent best match; (2) one-to-one match; and (3) EMD match. Independent best match systems such as Blobworld and NETRA find the best matched region for each query region and calculate the overall similarity score using fuzzy-logic operations or weighted sum. Since each query region is matched independently, multiple regions in the query image might be matched to the same region in a target image, which is undesirable in many cases. As an extreme example, consider an image A full of red balloons and a very different image B with a red ball in it. Since each red balloon in A matches the red ball in B very well, these two images will be considered very similar by independent best match.

One-to-one match systems like Windsurf and WALRUS consider matching one set of regions to another set of regions and require that each region can only be matched once. For example, Windsurf uses the Hungarian Algorithm to assign regions based on region distance. Region size is then used to adjust two matching regions' similarity. Image similarity is defined as the sum of the adjusted region similarity. One-to-One match assumes good image segmentation so there is good correspondence between two similar images' regions. But current segmentation techniques are not perfect and regions do not always correspond to objects. Moreover, it is hard to define an optimal segmentation, as one image may need different segmentations when comparing to different images.

EMD match systems use similarity measures based on the Earth Mover's Distance (EMD). Although EMD is a good measure for region matching, its effectiveness is closely linked to the underlying distance function used for pairs of regions as well as the weight given to each region. Since these systems directly use the region distance function as the ground distance for EMD and use normalized region size as the region weight, this creates problems such as regions being weighted inappropriately. As a result, these systems do not use EMD very well.

There are no commercial systems for automatic audio query with the complexity or capabilities desired for a general purpose search engine. Websites such as Findsounds.com rely on text-based searching of sound file names. The technology of Comparisonics Inc. (the developer of Findsounds.com) allows the colorized display of sound feature data once the sound is found by name, but the features are not used for the indexing/query. Other music websites such as Moodlogic.com combine filenames with user preference rankings to generate similarities for music recommendation. The largest and most popular available research system for audio segmentation, classification, and query is MARSYAS, developed by George Tzanetakis and Co-PI Perry Cook at Princeton University. This software is publicly available, and recent conferences such as the International Symposium on Music Information Retrieval, the Conference on Digital Audio Effects, and the International Computer Music Conference revealed that MARSYAS is now the basis of approximately 80% of the current research in music information retrieval.

Most research in audio query has focused on the music domain. Some recent research projects include identifying the passages within a song when a singing voice is present and identifying the singer in a complex recorded song. Another recent project is the WinPitch Corpus, which automatically aligns speech recordings with text files.

The closest related work to similarity searches for genomic data is work in clustering of gene expression matrices to identify related patterns. Many different clustering algorithms have been proposed for microarray analysis. The general goal of such algorithms is to find biologically relevant groupings of genes and/or experiments from microarray data. Hierarchical clustering using average or complete linkage is probably most widely applied. Self organizing maps (SOM) are another commonly used technique.

Other authors have suggested using mutual information relevance networks, clustering by simulated annealing, model-based clustering, graph-theoretic approaches, as well as other methods. A recent promising trend in clustering algorithms has been an emergence of methods that are probabilistic in nature, thus allowing one gene to be a member of more than one cluster. However, all these algorithms have one common and serious limitation—they define similarity over the whole gene expression vector, thus making it impossible to successfully apply these techniques to large diverse databases of expression information that cover thousands of experiments, with different sets of genes coexpressed in different subsets of experiments. This problem can be addressed by bi-clustering algorithms, but exact solution to this problem for microarray data is NP-complete. Some approximation methods have been developed recently. These include a two-sided clustering algorithms called plaid models, a biclustering method in which low-variance submatrices of the complete data matrix are found, and a bi-graph based biclustering method. However, all these algorithms are very slow and have various limitations on bicluster size and qualities. They cannot be realistically applied to databases of thousands of microarray experiments.

SUMMARY OF THE INVENTION

The present invention disclosed and claimed herein is a system and method for a content-addressable and searchable storage system for managing and exploring massive amounts of feature-rich data such as images, audio or scientific data. In a preferred embodiment of the invention, the system comprises a segmentation and feature extraction unit for segmenting data corresponding to an object into a plurality of data segments and generating a feature vector for each data segment; a sketch construction component for converting a feature vector into a compact bit-vector corresponding to the object; a similarity index comprising a plurality of compact bit-vectors corresponding to a plurality of objects; and an index insertion component for inserting a compact bit-vector corresponding to an object into the similarity index. The system may further comprise an indexing unit for identifying a candidate set of objects from said similarity index based upon a compact bit-vector corresponding to a query object. Still further, the system may additionally comprise a similarity ranking component for ranking objects in said candidate set by estimating their distances to the query object.

A method of comparing a search image to a first plurality of stored images in accordance with an embodiment of the invention comprises the steps of segmenting the search image into a plurality of search image regions; extracting a region feature vector from each of the search image regions; converting each of the region feature vectors into a region bit vector; storing the region bit vectors; calculating a region weight for each of the search image regions; embedding all of the region bit vectors and region weights into a composite search image feature vector; storing the composite search image feature vector; and selecting a second plurality of images from the database using the composite search image feature vector, wherein the second plurality of images comprises a subset of the first plurality of images. A region's weight comprises a normalized square root of the region's size.

A method in accordance with a preferred embodiment of the invention may further comprise the steps of calculating an image dissimilarity match between the search image and each of the second plurality of images using the region bit vectors of the search image; and selecting a third plurality of images based upon the image dissimilarity matches, wherein the third plurality of images comprises a subset of the second plurality of images. The image dissimilarity match may comprise an Earth Mover's Distance using a square root region size as a region weight. The image dissimilarity match also may comprise an Earth Mover's Distance using a thresholded region distance.

A method in accordance with another preferred embodiment of the invention further comprises the steps of calculating a distance between two of the plurality of regions by XOR-ing their region bit vectors; comparing the distance to a threshold; selecting the distance as a region ground distance function if the distance is less than the threshold; selecting the threshold as the region ground distance function if the distance is greater than the threshold; calculating an image dissimilarity match between the search image and each of the second plurality of images using the region bit vectors and the ground distance function; and selecting a third plurality of images based upon the image dissimilarity matches, wherein the third plurality of images comprises a subset of the second plurality of images.

Still other aspects, features, and advantages of the present invention are readily apparent from the following detailed description, simply by illustrating preferable embodiments and implementations. The present invention is also capable of other and different embodiments, and its several details can be modified in various respects, all without departing from the spirit and scope of the present invention. Accordingly, the drawings and descriptions are to be regarded as illustrative in nature, and not as restrictive.

BRIEF DESCRIPTION OF THE DRAWINGS

The accompanying drawings, which are incorporated in and constitute a part of this specification illustrate some embodiments of the invention and, together with the description, serve to explain some aspects, advantages, and principles of the invention. In the drawings.

DETAILED DESCRIPTION OF THE INVENTION

The present invention provides a content-addressable and searchable storage system. The data in the system preferably is organized dynamically based on demand. The system has a similarity search engine for searching massive amounts of feature-rich, noisy, high-dimensional data.

Figure 1:
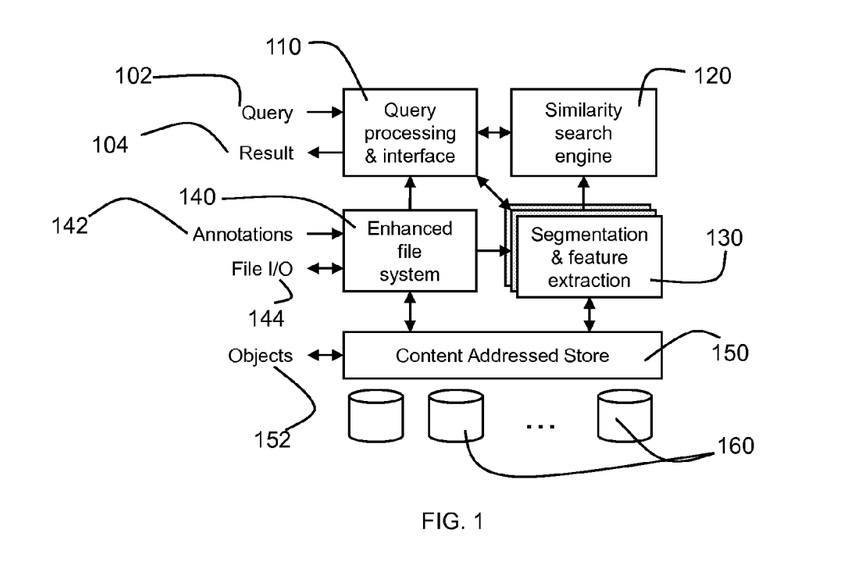
FIG. 1 is a block diagram of a content-addressable and searchable storage system architecture in accordance with an embodiment of the present invention.

The general system architecture of a preferred embodiment of the invention will be described with reference to FIG. 1. The general system architecture has four main data paths: objects 152; file I/O's 144; annotations 142, and search queries 102. Objects can be addressed directly through a content-addressed store 150 that implements a content-addressed abstraction. A client can store a data object into the content addressed store 150 and get its fingerprint or hash back as its "id." The content addressed store allows clients to access segments of an object. The storage system uses fingerprints as the uniform mechanism to address both data objects and segments.

Clients can perform regular file I/Os via a standard file system interface implemented by the Enhanced File System 140. The standard file system interface allows existing applications to perform traditional file I/Os to input and output data. As the data enters the system, it will be delivered to a Segmentation and Feature Extraction Unit 130 (data type dependent) which will segment the data into multiple segments, perform feature extraction, and then pass the extracted multi-dimensional vectors to the Similarity Search Engine 120 to construct compact metadata.

Attributes and user-defined annotations can be associated with individual files and directories. The Enhanced File System 140 implements the mechanism for the associations and also relational searches for desired attributes and annotations. Attributes are generated automatically by the input data processing units as the data enters into the system, while annotations are provided by the users.

Query Processing and Interface 110 implements a query interface for users to perform searches and data exploration in the system. It allows users to provide sophisticated similarity search queries that include query data and a search range. It also implements a user interface for users to browse and explore result data objects. The query data will be processed and converted into multi-dimensional feature vectors and then passed to the similarity search engine. A corresponding Segmentation and Feature Extraction 130 unit performs the conversion, while the Similarity Search Engine 120 implements the core similarity search capability and returns a list of data objects ranked by similarity.

The proposed system encourages users to use the content-based similarity search capability to search and manage massive amounts of feature-rich data instead of using the traditional file system interface. It may be useful to combine the similarity search capability with a search range constrained by attributes (such as time, size, data type, owner, and so on) and user-defined annotations. Users can find their data conveniently and quickly by meaningful contents instead of meaningless file names (such as those created by today's digital cameras). The following three examples the usefulness of such a system.

The first example is managing digital images. Consider a user who has millions of digital photos and would like to find as many photos with waterfalls as possible during the past three years. With traditional file systems, the user's digital photo collections are stored by meaningless file names automatically generated by a digital camera. To find the desired digital photos, the user first looks through all her directories created during the past three years and scan through each in image thumbnail mode. This process will be extremely inefficient and very time consuming. With the proposed system, the user could upload her photos without needing to know file names and directory names. When the user needs to find photos with waterfalls, she would first find one photo with waterfalls and then issue a query to find all images similar to the query data and specify a search range from 2001 to 2004. The system would present her desired photos.

The second example is managing audio data. Consider a research professor who regularly records her lectures, as well as her research group meetings. Years later they might want to make a summary based on what was said every time mobile storage was mentioned. A search query of this type could be done either by typing "mobile storage" into a text field, or saying the words "mobile storage" into a microphone. The system then would bring up all of the audio files it could find that contain the relevant speech recognized words, and also all regular text files (lecture notes, meeting minutes, emails, etc.) that contain the words either in the filename or in the content. Another example query could be of the form "Display all audio segments that contain simple conversations (one or two clear speakers) over a train station background." The system would search for audio textures matching the query, and present them in a rank ordered listing with dates and origin information.

The third example is data exploration of genomic data. Consider a biologist who just identified a new gene that seems to be involved in cancer progression. The biologist ran a microarray experiment in which she produced a pattern of expression for this gene (and others in the genome) over a large set of conditions. She wants to identify any known genes that may have the same pattern of expression, so she queries the system with her experimental data and the name of the gene of interests. The biologist will then see all genes with similar expression patterns to the gene of interest over any subset of experiments. This may give her clues about the function of her gene of interest in carcinogenesis, and provide her leads for design of further experiments.

A preferred embodiment of the invention constructs sketches of the data. These sketches are tiny data structures that can be used to estimate properties of the original data. For example, a distance function on pairs of data items could be estimated by only examining the sketches of the data items. Sketch constructions have been developed for a number of purposes, including estimating similarity of sets, estimating distinct elements and vector norms, and estimating string edit distance. Sketch constructions can be derived from rounding techniques used in approximation algorithms. Many sketch constructions for estimating similarity and distances can be viewed as embeddings (approximate distance preserving mappings) from the data points to points in a normed space, usually $L_1$ or $L_2$. Once such a mapping is obtained, sketching techniques for $L_1$ or $L_2$ can be applied.

By using sketches constructed from feature vectors in the similarity search engine, the present invention speeds up similarity searches and maintains the similarity search quality while substantially reducing the metadata size. A sketch-based indexing system also may be used for efficient similarity searches.

Figure 2:
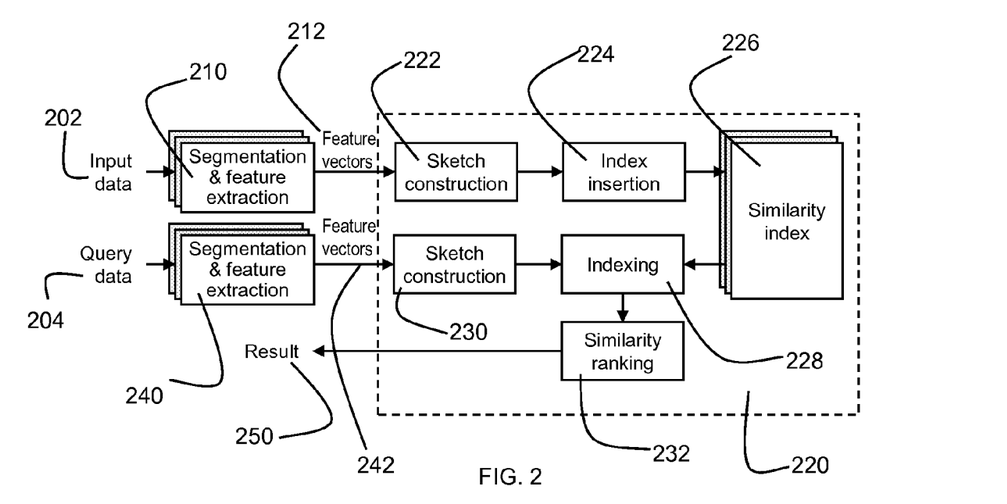
FIG. 2 is a block diagram of a similarity search engine in accordance with an embodiment of the present invention.

A similarity search engine 120 in accordance with preferred embodiment of the invention is shown in FIG. 2. The similarity search engine 120 works with feature vectors and client-defined distance functions. The similarity search engine has two main operations: data input and similarity searching. Input data 202 enters a segmentation and feature extraction unit 210, depending on its data type. The segmentation and feature extraction unit 210 segments the input data 202 and generates a feature vector for each segment. Each piece of input data is then represented by a group of feature vectors 212. The feature vectors 212 have a client-defined distance function. The sketch construction component 222 converts a feature vector into a compact bit-vector or sketch. The sketches are then passed to the index insertion component 224 which inserts them into a similarity index 226.

When a query is presented to the similarity search engine 120, the query data 204 is first passed to a specific segmentation and feature extraction unit 240, depending on its data type. The segmentation and feature extraction unit 240 may be the same unit as segmentation and feature extraction unit 210 or may be a different unit. The feature segmentation and extraction unit 240 unit will segment the query data 204 and generate a set of feature vectors 242. The feature vectors 242 are passed to the sketch construction component 230 to convert them into a group of sketches. The sketch construction component 230 may be the same component as sketch component 222 or may be a different sketch construction component. The indexing unit 228 looks up the similarity index 226 to find a candidate set of objects. The candidate set may include objects that are not similar to the query object, but it misses very few objects that are similar. The similarity ranking component 232 will rank the objects in the candidate set by estimating their distances to the query object. It will filter out the objects whose distances to the query object are beyond a certain threshold.

The use of sketches in the similarity search engine achieves high-speed similarity searches and reduces the metadata space requirement. The sketch construction unit 222, 230 converts a multi-dimensional feature vector into a sketch, a very small bit vector that can be used to estimate the distance function of the original data. Such a sketch can typically be 1/10 the feature vector size without losing similarity search quality.

The segmentation and feature extraction units 210, 240 are data dependant. Thus, the system of a preferred embodiment provides a convenient interface such that users can "plug-in" new segmentation and feature extraction units easily. Examples of segmentation and feature extraction units will be described for image data, audio data and genomic data. Those skilled in the art will recognize that segmentation and feature extraction units for other types of data may be used with the invention.

Figure 3:
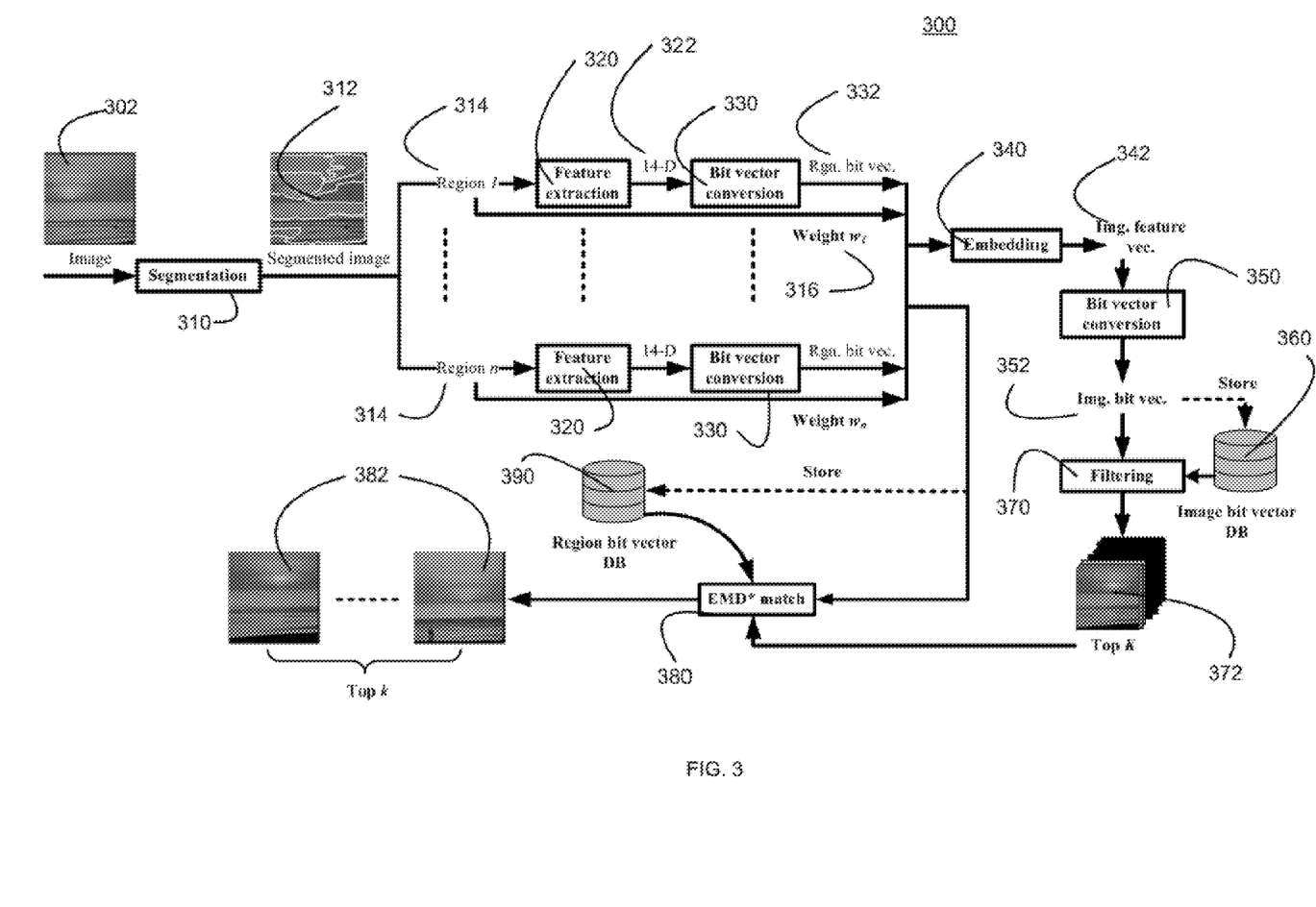
FIG. 3 is a block diagram of the main components and method of inserting or querying an image in accordance with an embodiment of the present invention.

FIG. 3 shows the main components of a preferred embodiment of an image similarity search method of the present invention and illustrates the steps an image goes through when it is inserted into the system, or is submitted as a query image. The preferred embodiment incorporates a new region feature representation with weighted $L_1$ distance function and improved Earth Mover's Distance ("EMD") match that will be referred to herein as "EMD*."

When an image 302 is inserted into the system, segmentation component 310 segments it into several homogeneous regions 312. For each region 314, feature extraction component 320 extracts a 14-dimensional feature vector 322. Each region preferably, but not necessarily, is represented by a simple feature-vector that includes two kinds of information about a region: color moments and bounding box information. Color moments are compact representations that have been shown to be only slightly worse in performance than high-dimensional color histograms. In the preferred embodiment, the first three moments from each channel in the HSV color space are extracted, resulting in a nine-dimensional color vector. A bounding box is the minimum rectangle covering a region. Each region's bounding box is calculated, thereby obtaining the following information:

| | |
|---|---|
| x_ | bounding box width |
| y_ | bounding box height |
| p_ | # of pixels in a region |
| r_ = x_/y_ | aspect ratio |
| s_ = x_·y_ | bounding box size |
| a_ = p_/s_ | area ratio |
| (cx, cy) | region centroid |

A 5-dimensional vector is used to represent a regions bounding box information: $(\ln(r\_), \ln(s\_), a\_, c_x, c_y)$.

In other embodiments, more dimensions may be added to the feature vector. For example, shape information may be extracted from a region using known or new shape recognition methods and be added into the feature vector. Additionally, another level of segmentation by segmenting the regions into sub-regions also may be added to the system to provide more detailed information. This will change the feature representation from a group of feature vectors to a three-level tree of feature vectors. The two-level segmentation allows the implementation of the capability to query an object in addition to a whole image.

Bit vector conversion component then converts the 14-dimensional feature vector 322 into a region bit vector 332 using a thresholding and transformation algorithm. This results in very compact representation of each region.

The thresholding and transformation algorithm preferably approximates weighted (and thresholded) $L_1$ distance of real-valued feature vectors with Hamming distance of bit vectors. The bit vector representation is much more compact than the real-valued feature vector representation; and it is also much faster to calculate Hamming distance of bit vectors (XORing bits) than weighted (and thresholded) $L_1$ distance of feature vectors (floating point operations).

---

Algorithm 1: Generate N × K Random (i, t) Pairs input: N, K, d, l[d], u[d], w[d]
output: p[d]; rnd_i[N][K]; rnd_t[N][K]
$p_i = w_i \times (u_i - l_i)$; for $i = 0, \ldots, d - 1$ normalize $p_i$ s.t. $\sum_{i=0}^{d-1} p_i = 1.0$ for (n = 0; n < N; n + +) do
  for (k = 0; k < K; k + +) do
    pick random number $r \in [0, 1)$     find i s.t. $\sum_{j=0}^{i-1} p_j <= r < \sum_{j=0}^{i} p_j$     rnd_i[n][k] = i
    pick random number $t \in [l_i, u_i]$
    rnd_t[n][k] = t
  end for
end for

---

Bit vectors are generated from d-dimensional vectors such that the expected Hamming distance between two bit vectors produced is proportional to the weighted $L_1$ distance between the corresponding vectors. In order to do this, a single bit from each d-dimensional vector such that the probability that the bit produced is different for two vectors is proportional to their weighted $L_1$ distance. The required bit vectors are produced by repeating this process to produce several bits and concatenating them together. For example, suppose one wants to compute weighted $L_1$ distance for d-dimensional vectors, where the ith coordinate is in the range $[l_i; h_i]$ and has weight $w_i$. Let $T=\Sigma_i w_i \times (h_i - l_i)$, and $p_i = w_i \times (h_i - l_i)=T$. Note that $\Sigma_i p_i = 1$. To generate a single bit, pick $i \in [0; d-1]$ with probability $p_i$, pick a uniform random number $t \in [l_i; h_i]$. For each vector $v=(v_1, \ldots, v_d)$, $$\text{bit} = \begin{cases} 0 & \text{if } v_i < t \\ 1 & \text{if } v_i >= t \end{cases}$$

---
Algorithm 2: Convert Feature Vector to N-Bit Vector
---

```
input: v[d], N, K, rnd_i[N][K], rnd_t[N][K]
output: b[N]
for (n = 0; n < N; n + +) do
    x = 0
    for (k = 0; k < K; k + +) do
        i = rnd_i[n][k]
        t = rnd_t[n][k]
        y = (v_i < t ? 0 : 1)
        x = x ⊕ y
    end for
    b_n = x
end for
```

Note that an (i, t) pair determines the value of one bit for each vector. To make the transformation consistent across all vectors, for each bit we generate, the same (i, t) pair must be applied to each vector. The process of generating (i, t) pairs is described in Algorithm 1. Here, N K such pairs are generated where N is the size of the final bit vector desired (after thresholding) and K is a parameter which will be determined later.

Next, the distance function is transformed so the distance is thresholded at a given threshold δ. Algorithm 1 generates N K (i; t) pairs which give rise to N groups of K bits each. A single bit is produced from each group of K bits by applying a hash function to them. The hash function could be XOR, or some other random hash function. This achieves the desired thresholding. An implementation of the algorithm is shown here. Algorithm 1 is the initializing process, where N×K random (i, t) pairs are generated. Then for each feature vector, Algorithm 2 is called to convert the feature vector to an N-bit vector.

The distance between two regions can be calculated efficiently by XORing their region bit vectors. Next, all the n region bit vectors along with their weights are embedded at embedding component 340 into a single image feature vector 342, such that the $L_1$ distance on two images' embedded feature vectors approximates the EMD* between these two images.

The preferred image similarity measure EMD* is based on Earth Mover's Distance (EMD) or Transportation Metric, which is a flexible similarity measure between multidimensional distributions. Given two distributions represented by sets of weighted features and a distance function between pairs of features, EMD reflects the minimal amount of work needed to transform one distribution into another by moving distribution "mass" (weights) around.

EMD can be computed via (weighted) bipartite matching, but this is a relatively expensive operation. Prior RBIR systems have used "EMD match"-based image similarity measures where the region distance function is used as the ground distance of EMD and normalized region size is used as region weight. However, these prior "EMD match"-based image similarity measures do not use EMD appropriately. In particular, the distance function and region weight information that are inputs to EMD are inappropriate.

First, a region's importance in an image is not proportional to that region's size. For example, a large region (e.g. front door) usually should not be considered much more important than a small region (e.g. a baby). Accordingly, the preferred embodiment uses the normalized square root of region size as each region's weight, which reduces the difference between small and large regions, and assigns suitable weights in most segmentation scenarios. Second, similar images may still have very different regions (e.g. the same baby with a different toy). If one simply use the region distance function, two similar images may be considered different only because they have two very different regions. To address this problem, distance thresholding preferably is used after calculating the distance between two regions. Roughly speaking, if the distance between two regions is larger than a threshold δ, we use δ as the region distance. By setting an upper bound on region distance, we reduce the effect that an individual region can have on the whole image, making our image similarity measure more robust.

Thus, the preferred embodiment defines image dissimilarity as the EMD using square root region size as region weight, and thresholded region distance as the ground distance function. This measure is referred to as "EMD* match"-based image similarity measure.

For compactness and efficiency in distance calculation, the image feature vector 342 is also converted into a bit vector 352 by bit vector conversion component 350. Both the image bit vector 352 and the individual region bit vectors 332 (with region weights) are stored into a database 360, 390 for future image retrieval.

A query image goes through the same process of segmentation, feature extraction, bit vector conversion, embedding, and bit vector conversion. Then the query image bit vector is used to do filtering 370 in the image database and obtain the top K images 372 that are closest to the query image's bit vector. The exact EMD* match 380 between the query image and each of the K images 372 is calculated using their region bit vectors. Finally the top k images 382 with smallest EMD* match to the query image are returned.

In order to perform similarity searches on a large image database, the system preferably uses a filtering method 370 via approximate EMD embedding. The goal is to find a small candidate image set 372 for the EMD* match by filtering out most of the images which are very different from the query image. The challenge is to quickly find a candidate image set that contains most of the similar images.

Previous filtering methods do not work well. The first kind of filtering is to index individual regions and combine the filtering results of all the regions to form the candidate image set. This approach is not effective, because it loses the information of image-level similarity. The second kind is to use a technique to embed EMD into $L_1$ distance and then use Locality Sensitive Hashing (LSH) to find the nearest neighbor(s) in the latter space. This method has interesting provable properties, but it does not work well with compact data structures nor does it consider distance thresholding on real-valued vectors.

The present invention uses a new EMD embedding technique that converts a set of region bit vectors 332 into a single image feature vector 342, and the $L_1$ distance on the embedded image feature vector 342 approximates the EMD on the original region bit vectors 332. The basic step involves picking several random positions $(p_1, \ldots, p_n)$ and checking for a particular bit pattern $(b_1, \ldots, b_n)$ at these positions. Given an image $$I = \{(r_1, w_1), \ldots, (r_k, w_k)\}$$

where $r_i$ is the bit vector for the $i^{th}$ region and $w_i$ is its weight, and a random pattern $$P = \{(p_1, b_1), \ldots, (p_h, b_h)\}$$

where $p_j \in 0, N-1$ and $b_j \in 0, 1$, we say region $r_i$ fits pattern P if $$r_{i,pj} = b_j \text{ for } j=1, 2, \ldots, h.$$

Here $r_{i,pj}$ denotes the $p_j$th bit of vector $r_i$. The matched weight of image I wrt. pattern P preferably is defined as the sum of the weights of the regions in image I that fit pattern P:

$$MW(I, P) = \sum_i w_i \forall i \text{ st} \cdot r_i \text{ fits pattern } P$$

In the example below, if random positions 3, 5 and 7, were picked and random bit pattern "011", both $r_1$ and $r_3$ fit the pattern (shown in bold numbers), so the matched weight is 0.1+0.3=0.4.

|       | 1 | 2 | 3 | 4 | 5 | 6 | 7 | 8 | $w_i$ |
|-------|---|---|---|---|---|---|---|---|-------|
| $r_1$ | 1 | 0 | 0 | 1 | 1 | 0 | 1 | 0 | 0.1   |
| $r_2$ | 0 | 0 | 1 | 1 | 0 | 1 | 1 | 0 | 0.6   |
| $r_3$ | 0 | 1 | 0 | 0 | 1 | 0 | 1 | 1 | 0.3   |
| MW    |   |   |   |   |   |   |   |   | 0.4   |

Intuitively, if two region vectors are similar, they have more bits in common than other regions. So there is a higher chance that two similar regions both fit (or not fit) a random pattern. Given two similar images, each random pattern picks out the regions in the two images that are similar, in effect matching similar regions to each other. If two images are similar, their matched weight wrt. and random pattern should be close to each other. A vector is obtained for every image by listing the matched weights for a number of randomly chosen patterns, and distances between images will be computed by $L_1$ distances between these image vectors. When sufficiently many random patterns are used to generate the image vectors, the $L_1$ distance between image vectors should be able to distinguish between similar and dissimilar images.

These techniques are designed for distributions on high dimensional bit vectors, while prior methods, such as that disclosed in P. Indyk and N. Thaper, "Fast Image Retrieval via Embeddings," 3$^{rd}$ Int'l Workshop on Statistical and Computational Theories of Vision, 2003, are described for distributions of points in $R_d$, where d is small. Roughly, they decompose the space into collections of disjoint d-dimensional cubes. In fact they have a hierarchy of decompositions for different granularities. For each cube in this decomposition, they calculate the weight of the distribution that falls into this cube and build a vector by listing these counts (suitably weighted). In the technique of the preferred embodiment, the idea of computing the matched weight for a random pattern is analogous to computing the weight that falls into a cube. The prior embedding, such as in Indyk and Thaper, uses different levels of granularity and the weights assigned to them are exponentially decreasing. This creates problems when sampling coordinates to estimate weighted $L_1$ distance by hamming distance of compact bit vectors; the problem is that the random variables involved have high variance. The scheme of the preferred embodiment of the present invention can be thought of as using only one level of granularity and this is designed to get around this problem with using many different levels.

The implementation of the embedding algorithm is divided into two pieces. The first is Algorithm 3 which generates M sets of random positions and picks a random bit pattern for each set.

---
Algorithm 3 Generate M H-bit Random Patterns
---
input: M, H, N(region bit vector length)
output: P[M][H], B[M][H]
for (i = 0; i < M; i + +) do
    for (j = 0; j < H; j + +) do
        pick a random position p ∈ [0, N − 1]
        pick a random bit b ∈ {0, 1}
        P[i][j] = p
        B[i][j] = b
    end for
end for The second piece is Algorithm 4 which, given an image represented by a list of region bit vectors and their corresponding weights, computes its EMD embedding using the random patterns generated by Algorithm 3.

---
Algorithm 4 Image EMD Embedding
---
input: k, r[k][N], w[k], M, H, P[M][H], B[M][H]
output: MW[M]
for (i = 0; i < M; i + +) do
    mw = 0:0
    for (j = 0; j < k; j + +) do
        h = 0
        while (h < H) && (r[j][P[i][h]] == B[i][h]) do
            h + +
        end while
        if h == H then
            mw = mw + w[j]
        end if
    end for
    MW[i] = mw
end for After the embedding, each image is represented by a M-dimensional real-valued vector. It is further converted to a bit vector using the same algorithm used for converting region feature vectors to region bit vectors. As a result, each image is now represented by a compact bit vector and the Hamming distance between two images can be efficiently computed by XORing their bit vectors. The filtering algorithm ranks images based on the Hamming distance of their embedded image bit vectors to the query image's bit vector and return the top K images for exact EMD computation.

Unlike two-dimensional images, audio takes place in time, so audio segmentation is the process of breaking up an audio stream into time sections that are perceptually different from adjacent sections. The audio "texture" within a given segment is relatively stable. Examples of segment boundaries could be a transition from background sound texture to the beginning of speech over that background. Another segment boundary might occur when the scene changes, such as leaving an office building lobby and going outside onto a busy street. Audio segmentation can be accomplished in two primary ways: blind segmentation based on sudden changes in extracted audio features, and classification based segmentation based on comparing audio features to a set of trained target feature values. The blind method works well and is preferred when the segment textures are varied and unpredictable, but requires the setting of thresholds to yield the best results. The classification-based method works well on a corpus of pre-labeled data, such as speech/music, musical genres, indoor/outdoor scenes, etc. databases. Either method requires the extraction of audio features.

Audio feature extraction is the process of computing a compact numerical representation of a sound segment. A variety of audio features have been used in systems for speech recognition, music/speech discrimination, musical genre (rock, pop, country, classical, jazz, etc.) labeling, and other audio classification tasks. Most features are extracted from short moving windows (5-100 milliseconds in length, moving along at a rate of 5-20 windows per second) by using the Short Time Fourier Transform. Wavelets and compressed data have also been used. Features can be computed at different time resolutions, and the value of each feature, along with the mean and variance of the features can be used as features themselves.

Common audio features include power, spectral centroid and rolloff (measures of the relative brightness of sound), spectral flux (a measure of the frame-to-frame variance in spectral shape), zero crossing rate (noisiness), and Mel-Frequency Cepstral Coefficients (MFCCs), which is a compact representation of spectral shape. For domain-specific tasks such as music query/recognition, features such as the Parametric Pitch Histogram, and Beat/Periodicity Histogram can be calculated and used. These might be of limited use in certain real-world situations as well. Selection of the correct feature set for a given task has proven to be an important part of building successful systems for machine "audio understanding." For a fixed corpus, computing many features (40 dimensions or more), then using Principal Components Analysis has proven successful for reducing the dimensionality of the feature/search space.

Large numbers of gene expression microarray experiments are represented as matrices of real valued measurements, where a value in row i and column j is the expression level of gene i in experiment j. Thus, these data are already represented in terms of real-valued vectors, but they do require pre-processing for effective search. The goal of similarity search on genomic data is to identify genes that share patterns of expression. A simple way to do this is to identify closest expression vectors over all experiments, but this is not biologically relevant. In cells, genes act in varying ways under different conditions, and thus two genes coexpressed under one set of conditions may not be co-expressed under another set of conditions. Thus, it is necessary to identify groups of experiments under which sets of genes are potentially co-regulated.

This means that to solve the problem of search for gene expression data exactly, one needs to solve the bi-clustering problem for large matrices of gene expression data—an NP complete problem. As no such solution exists, similarity search is essential in this domain. Bi-clustering approximation algorithms may be used to identify small, incomplete bi-clusters of 2-5 genes, which can be used to define feature vectors. This limit on bi-cluster size will make bi-clustering algorithms tractable, and similarity search will allow these feature vectors to identify complete bi-clusters.

Although the system allows users to define a similarity distance function for a specific data type, a preferred embodiment of the invention provides support for a default similarity distance function that is general-purpose. The distance measure may be based on Earth Mover's Distance, which has been used successfully in both image and audio similarity searches. EMD is a flexible metric between multidimensional distributions, represented by sets of weighted features and a distance function between pairs of features. This calculates the minimal amount of work needed to transform one distribution into another by moving distribution "mass". This is a natural distance measure for weighted sets of features and is applicable to image, audio and scientific data. For example, two sound files that exhibit similar sub-segments, but in different order, would be judged similar by the EMD method.

For image feature vectors, the present invention improves upon the standard EMD measure in two ways. The standard EMD uses the region size as its weight and our first improvement is to use the normalized square root of region size as each region's weight to prevent large regions from dominating the distance calculation. The second improvement comes from the observation that using the raw distance function between regions may allow a pair of different regions to have a disproportionate effect on the overall distance calculation. This issue is address by thresholding the raw region distance function, thus making EMD more robust.

Although these improvements are described with respect to applications in the image domain, the underlying ideas are generally applicable to other domains as well. To make the similarity search engine general, the similarity search engine interface may be designed to allow each data type to define its own weight function and threshold for its EMD measure.

The foregoing description of the preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments as are suited to the particular use contemplated. It is intended that the scope of the invention be defined by the claims appended hereto, and their equivalents. The entirety of each of the aforementioned documents is incorporated by reference herein.

What is claimed is:

1. A method of searching a plurality of stored objects comprising the steps of:
   generating with a segmentation and feature extraction unit a collection of real-valued multi-dimensional vectors representing each said object, each of said multi-dimensional vectors having an associated weight;
   converting when executed by a disk each of said multi-dimensional vectors into a sketch using a thresholding and transformation algorithm and storing said sketch in a database to produce a collection of sketches corresponding to each object, wherein each said sketch comprises a bit vector that is more compact than a real-valued multi-dimensional vector from which said sketch is converted; and
   finding objects closest to a query object with a similarity search engine, wherein said similarity search engine finds said objects closest to said query object based upon said sketches stored in said database.

2. A method of searching a plurality of stored objects according to claim 1, wherein said step of finding objects comprises the steps of:
   defining a similarity distance between said objects using a weighted distance function based upon said collection of sketches; and
   finding objects closest to a query object based upon said weighted distance function.

3. A method of searching a plurality of stored objects according to claim 2, wherein said weighted distance function comprises a monotone function of matched distances.

4. A method of searching a plurality of stored objects according to claim 2, wherein said weighted distance function comprises an Earth Mover's Distance.

5. A method of searching a plurality of stored objects according to claim 2, wherein said step of finding objects closest to a query object comprises the step of using Earth Mover's Distance computation on said collection of sketches to filter objects to form a candidate set.

6. A method of searching a plurality of stored objects according to claim 5, further comprising the step of using a distance calculation to rank objects in said candidate set.

7. A method of searching a plurality of stored objects according to claim 2, further comprising the step of applying a transformation to each multi-dimensional vector to threshold the distances between pairs of vectors.

8. A method of searching a plurality of stored objects in accordance with claim 2, wherein the step of generating a collection of multi-dimensional vectors comprises the steps of:
- segmenting each object into a plurality of segments; and
- performing feature extraction on said plurality of segments corresponding to each object to produce said collection of multi-dimensional vectors.

9. A method of searching a plurality of stored objects according to claim 2, wherein said step of defining a similarity distance comprises the step of:
- generating multi-dimensional feature vectors corresponding to a query object and converting said multi-dimensional feature vectors into a plurality of sketches and corresponding weights using an embedding and conversion technique.

10. A method of searching a plurality of stored objects according to claim 1, wherein said step of finding objects comprises the steps of:
- combining said collection of sketches corresponding to an object into a combined sketch corresponding to that object;
- defining a similarity distance between said objects using a weighted distance function based upon said combined sketch; and
- finding objects closest to a query object based upon said weighted distance function.

\* \* \* \* \*

UNITED STATES PATENT AND TRADEMARK OFFICE
CERTIFICATE OF CORRECTION

| | | |
|---|---|---|
| PATENT NO. | : 7,966,327 B2 | Page 1 of 1 |
| APPLICATION NO. | : 11/219822 | |
| DATED | : June 21, 2011 | |
| INVENTOR(S) | : Kai Li et al. | |

It is certified that error appears in the above-identified patent and that said Letters Patent is hereby corrected as shown below:

In column 1, line 18, change "Not applicable" to "This invention was made with government support under Grant No. DE-FG02-ER25540 awarded by the Department of Energy and Grants Nos. CCR-0205594 and CCR-0237113 awarded by the National Science Foundation. The government has certain rights in this invention"

Signed and Sealed this
Twentieth Day of March, 2012

David J. Kappos
*Director of the United States Patent and Trademark Office*